(12) United States Patent
Cobb

(10) Patent No.: US 7,628,909 B2
(45) Date of Patent: Dec. 8, 2009

(54) COMPOSITION AND PROCESS FOR THE EXTRACTION OF BITUMEN FROM OIL SANDS

(75) Inventor: Harvey G. Cobb, North Little Rock, AR (US)

(73) Assignee: Coriba Technologies, L.L.C., North Little Rock, AR (US)

( * ) Notice: Subject to any disclaimer, the term of this patent is extended or adjusted under 35 U.S.C. 154(b) by 571 days.

(21) Appl. No.: 11/236,239

(22) Filed: Sep. 27, 2005

(65) Prior Publication Data

US 2006/0076273 A1  Apr. 13, 2006

Related U.S. Application Data

(60) Provisional application No. 60/613,443, filed on Sep. 27, 2004.

(51) Int. Cl.
*C10G 1/04* (2006.01)
(52) U.S. Cl. ..................................... 208/390; 208/391
(58) Field of Classification Search ......... 208/390–391; 166/270, 270.1
See application file for complete search history.

(56) References Cited

U.S. PATENT DOCUMENTS

| | | | |
|---|---|---|---|
| 3,334,688 A | | 8/1967 | Blackwell et al. |
| 3,637,017 A | * | 1/1972 | Gale et al. ............... 166/270.1 |
| 3,902,557 A | | 9/1975 | Shaughnessy et al. |
| 4,357,175 A | | 11/1982 | Buffington et al. |
| 4,553,593 A | | 11/1985 | Shaw |
| 4,599,117 A | | 7/1986 | Luxemburg |
| 4,634,540 A | | 1/1987 | Ropp |
| 4,813,482 A | | 3/1989 | Walton et al. |
| 4,846,275 A | * | 7/1989 | McKay .................... 166/402 |
| 4,929,341 A | | 5/1990 | Thirumalachar et al. |
| 5,042,580 A | | 8/1991 | Cullick et al. |
| 5,085,710 A | | 2/1992 | Goss |
| 5,306,416 A | * | 4/1994 | Le et al. .................... 208/108 |
| 5,797,701 A | | 8/1998 | Conaway |
| 5,922,653 A | | 7/1999 | Ahmed et al. |
| 5,928,522 A | | 7/1999 | Conaway |
| 6,096,227 A | | 8/2000 | Conaway |
| 6,105,672 A | | 8/2000 | Deruyter et al. |
| 6,225,263 B1 | | 5/2001 | Collins et al. |
| 6,251,290 B1 | | 6/2001 | Conaway |
| 6,267,893 B1 | | 7/2001 | Luxemburg |
| 6,325,152 B1 | | 12/2001 | Kelley et al. |
| 6,405,796 B1 | | 6/2002 | Meyer et al. |
| 6,454,003 B1 | | 9/2002 | Chang et al. |
| 6,543,535 B2 | | 4/2003 | Converse et al. |
| 6,673,231 B2 | | 1/2004 | Kim et al. |
| 2004/0035755 A1 | * | 2/2004 | Reeves ..................... 208/390 |
| 2004/0050755 A1 | * | 3/2004 | Page et al. ................. 208/428 |

FOREIGN PATENT DOCUMENTS

| | | | |
|---|---|---|---|
| CA | 2177018 | * | 11/1997 |
| WO | WO 2005/040435 A1 | | 5/2005 |
| WO | WO 2005/100745 A1 | | 10/2005 |

OTHER PUBLICATIONS

Evans, M. G. and Uri, N. (1949) "The Dissociation Constant of Hydrogen Peroxide and the Electron Affinity of the HO2 Radical." Transactions of the Faraday Society, vol. 45, pp. 224-230.*
Keller et al., A Unique, Reagent-Based, Separation Method for Tar Sands and Environmental Clean Ups, AIChE 2001 Annual Meeting, Nov. 6, 2001, Reno, Nevada, 16 pages.
EPA, A Citizen's Guide to Soil Washing, EPA 542-F-01-008, May 2001, 2 pages.
HydroPure Technologies, Inc., www.hydropuretech.com, 6 pages.

* cited by examiner

*Primary Examiner*—Robert J Hill, Jr.
*Assistant Examiner*—Brian McCaig
(74) *Attorney, Agent, or Firm*—Bracewell & Giuliani LLP

(57) ABSTRACT

The present invention provides a composition and method for separating bitumen from oil sands deposits. The invention includes a chemical composition having organic chemicals that can be used to stimulate the separation of one or more constituent components from oil sands. The chemical composition can be used for bitumen recovery from oil sands deposits and similar applications. The invention also includes a process for recovering bitumen and similar hydrocarbon oils from oil sands using the chemical composition. The chemical composition includes a peroxide and one or more additive compounds blended in an aqueous carrier solution. The additive compound is preferably a nitrogen-containing compound, an alcohol compound, or a combination of both. The aqueous carrier solution is of sufficient volume operable to disperse at least one of the peroxide and the additive compound in the aqueous carrier solution.

6 Claims, 3 Drawing Sheets

COMPOSITION AND PROCESS FOR THE EXTRACTION OF BITUMEN FROM OIL SANDS

CROSS-REFERENCE TO RELATED APPLICATION

This application claims priority to provisional patent application 60/613,443 filed Sep. 27, 2004.

TECHNICAL FIELD OF THE INVENTION

The present invention relates to a chemical composition and method of using the composition to separate bitumen from oil sands deposits.

BACKGROUND OF THE INVENTION

Oil sands are underground deposits comprised primarily of sand, water and bitumen or other like hydrocarbons. Bitumen is a heavy, viscous, crude oil hydrocarbon. Oil sands deposits in the United States and Canada represent verified oil reserves resources in the hundreds of billions of barrels. Other billions of barrels of verified oil sands reserves exist around the world.

Although the location of many oil sands deposits is known, economical methods to extract the bitumen oil have been elusive. Refiners have traditionally sought more efficient and economical ways to remove bitumen from oil sands so that the bitumen may be further processed to form gasoline and diesel fuels. Prior art technology for bitumen mining involves the use of surfactant, caustic and solvent solutions. This technology has been particularly beneficial in the Athabasca region of Canada, in theory because certain of the oil sands molecules in that region are encapsulated in moisture. It is believed that the moisture makes it possible for the mining technology to separate the oil from the substrate. Oil sands ore in other locations around the world, however, have not been found to have similar moisture characteristics. Therefore, attempts to use the mining process in other regions have failed to extract the oil. Further, use of the present technology in Canada has been expensive and has resulted in environmental concerns, particularly due to the production of hazardous waste streams and greenhouse gas emissions.

Therefore, it is desired to develop a technology for removal of bitumen from oil sands that exhibits improved extraction efficiency and reduced environmental damage, and that can be utilized in sands originating in a variety of locations. Further, there is a need for an efficient and cost effective recovery technique to maximize removal of bitumen and other similar hydrocarbon oils from oil sands deposits. Also, there is a need for bitumen recovery from oil sands that utilizes simple or existing equipment. Further, there is a need for a composition that can be added to oil sands deposits to recover bitumen without resulting in excessive reaction with the oil sands components or damage to the bitumen.

SUMMARY OF THE INVENTION

The present invention advantageously meets one or more of these needs and provides a composition and method for separating bitumen from oil sands deposits.

The invention includes a chemical composition having organic chemicals that can be used to stimulate the separation of one or more constituent components from oil sands. The chemical composition can be used for bitumen recovery from oil sands deposits and similar applications. The invention also includes a process for recovering bitumen and similar hydrocarbon oils from oil sands using the chemical composition. The chemical composition includes a peroxide and one or more additive compounds blended in an aqueous carrier solution. The additive compound is preferably a nitrogen-containing compound, an alcohol compound, or a combination of both. The aqueous carrier solution is of sufficient volume operable to disperse at least one of the peroxide and the additive compound in the aqueous carrier solution. The peroxide and the additive compound are substantially distributed throughout the carrier fluid, and the concentration of the chemical composition is preferably an amount effective to promote the separation of the oil sands into at least a bitumen phase and a sand phase. While heating is not required, slight elevation of temperature has shown positive effects. In a preferred embodiment, the temperature of the oil sands and chemical composition is elevated to about 80° F. to 160° F. The chemical composition is preferably noncorrosive, nonreactive, nontoxic and nonflammable.

In a preferred embodiment, the alcohol useful in the chemical composition of the invention contains from about one to about eight carbon atoms. The alcohol is preferably non-aromatic. More particularly, alcohols containing one to four carbons are particularly useful, i.e. methyl, ethyl, propyl, and/or buytl alcohol. Of the propyl alcohols, isopropyl alcohol is particularly preferred. Alcohol is preferred in an amount of approximately 4 to 24 percent by volume of the chemical composition.

In the chemical composition of the invention, a preferred carrier solution is water. This solution can also be fresh water or brine. Aqueous carrier solutions are preferred. In a preferred embodiment, there is only one carrier solution and it is substantially all water. The carrier solution in an amount of approximately 76 to 94 percent by volume of the chemical composition is preferred.

The nitrogen-containing compound of the chemical composition is preferably ammonia or ammonium hydroxide, and is present in an amount of approximately 2 to 8 percent by volume of the chemical composition. In the preferred embodiment, hydrogen peroxide is present in an amount of approximately 0.15 to 1.5 percent by volume in chemical composition.

This invention includes a process for recovering bitumen from oil sands located in underground oil vein deposits and the like. The process of the invention includes introducing the chemical composition into the underground deposit using a hydrojet in an amount effective to substantially increase the recovery of bitumen from the oil vein. The invention also includes a process for recovering bitumen from oil sands samples that have been removed from underground deposits. The process of the invention includes introducing the oil sands sample into a vat or the like and adding the chemical composition to the oil sands in an amount effective to substantially separate the bitumen from the remaining components in the sands. Batch processing, continuous processing or continuous batch processing are appropriate.

BRIEF DESCRIPTION OF THE DRAWINGS

So that the manner in which the features, advantages and objects of the invention, as well as others that will become apparent, may be understood in more detail, more particular description of the invention briefly summarized above may be had by reference to the embodiment thereof that are illustrated in the appended drawings, which form a part of this specification. It is to be noted, however, that the drawings illustrate only a preferred embodiment of the invention and are therefore not to be considered limiting of the invention's scope as it may admit to other equally effective embodiments.

DETAILED DESCRIPTION

Figure 1:
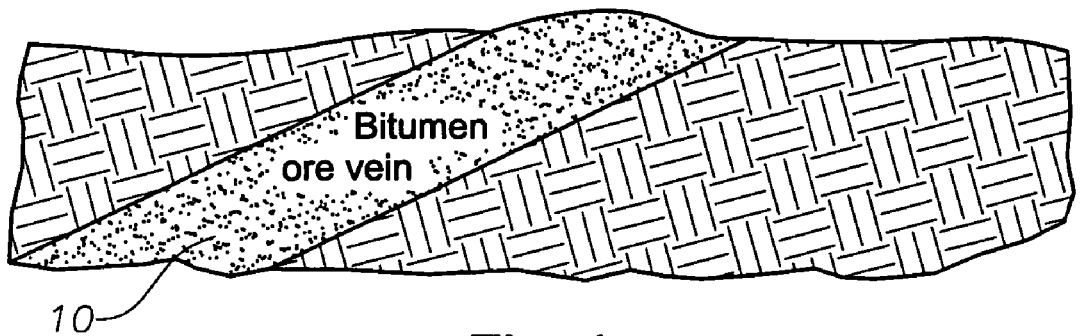
FIG. 1 is an underground bitumen ore vein and surface contour in a typical oil sands region.
Figure 2:
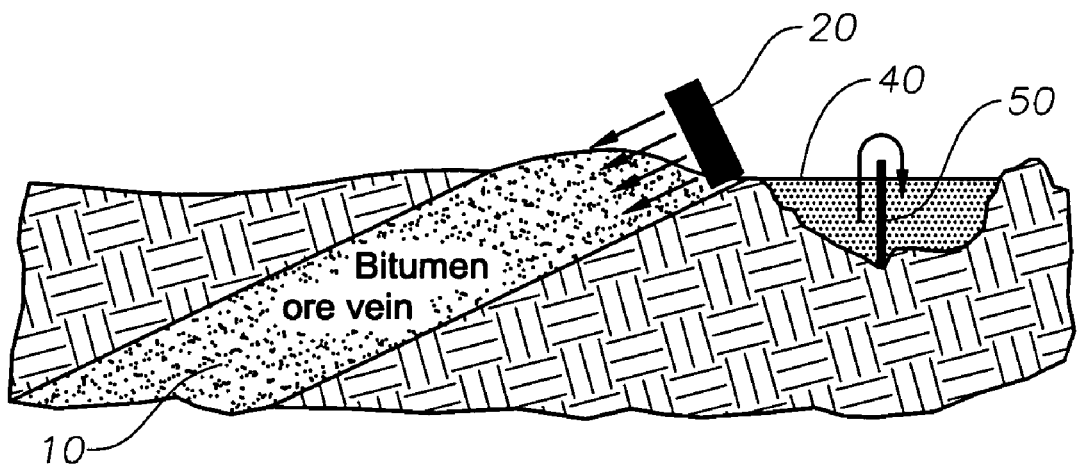
FIG. 2 is a simplified side view of a process for bitumen recovery that includes utilizing a hydrojet unit to disperse chemical composition into an underground oil sands deposit according to an embodiment of the present invention.
Figure 3:
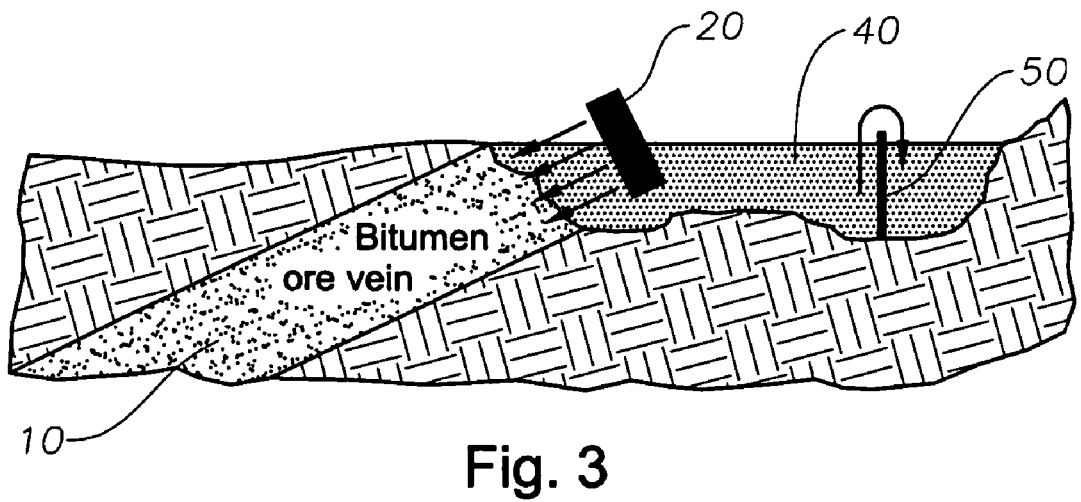
FIG. 3 is a simplified side view of the process of FIG. 2 in which the hydrojet unit travels deeper into the oil sands deposit.
Figure 4:
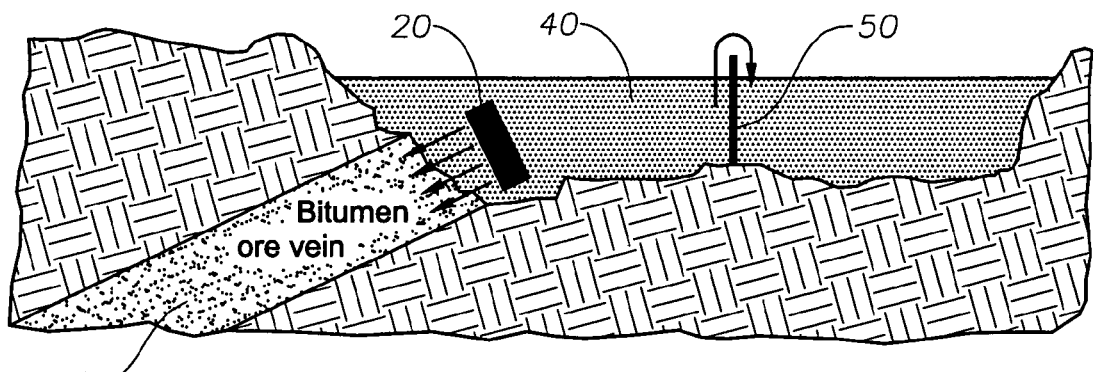
FIG. 4 is a simplified side view of the process of FIG. 3 in which the hydrojet unit travels deeper into the oil sands deposit.
Figure 5:
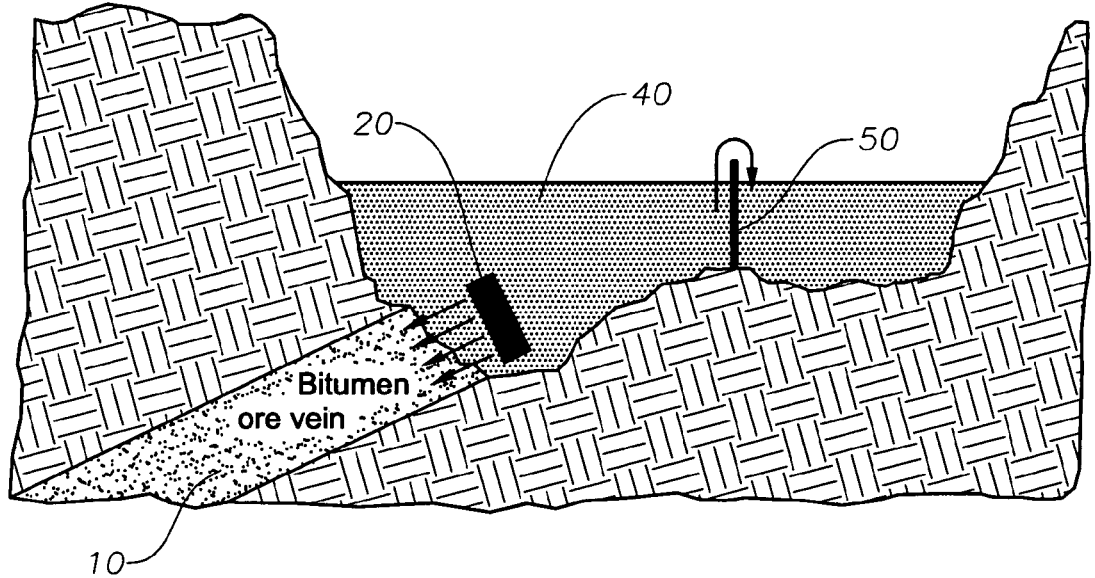
FIG. 5 is a simplified side view of the process of FIG. 4 in which the hydrojet unit travels deeper into the oil sands deposit.

The composition and process of the present invention may be utilized to remove bitumen from oil sands deposits located below the ground surface, or alternatively, from deposits that have been removed from the ground and transported to, for example, an industrial facility. Advantageously, the composition and process can be used in oil sands having different compositions and/or found in various locations around the world. FIG. 1 shows an underground bitumen ore vein 10 and surface contour in a typical oil sands region. FIG. 2 shows an embodiment of the present invention in which bitumen is removed in situ from oil sands located below ground surface. A hydrojet 20 travels subsurface through the ore vein 10 and distributes the chemical composition of the present invention within the ore vein 10. The addition of the composition to the oil sands material in the oil vein 10 preferably causes the material to separate into layers. The layers preferably consist of the primary constituent components of the material, namely, bitumen, water and sand. The layer of bitumen can then be removed from the ore vein and utilized for a desired purpose.

Figure 6:
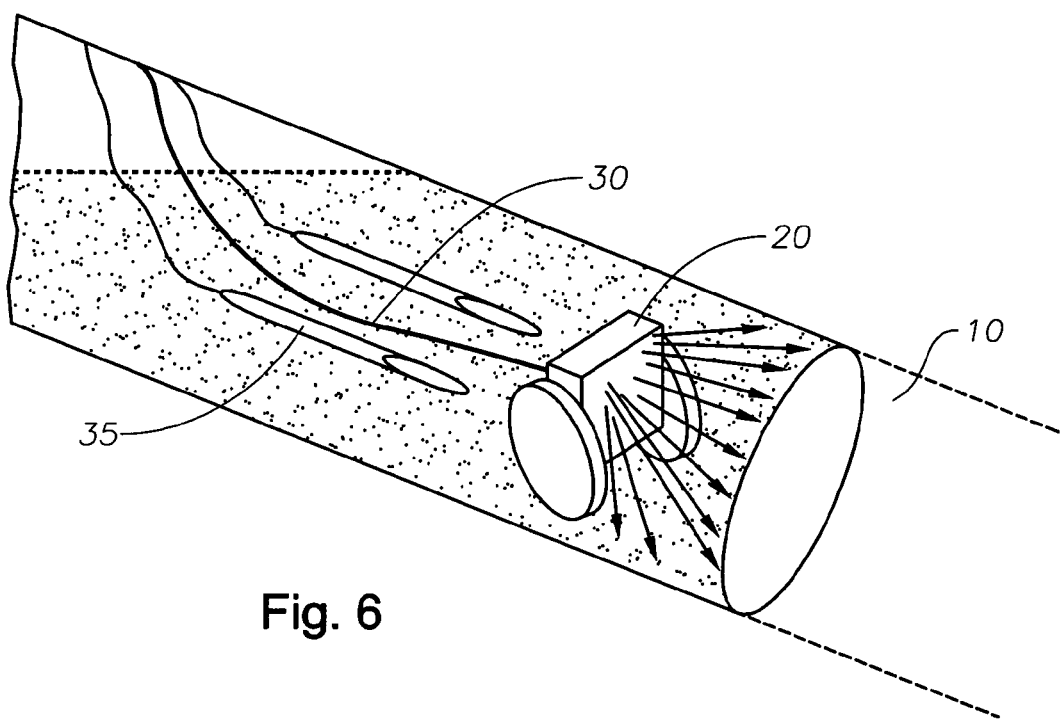
FIG. 6 is an enlarged simplified side view of the process for bitumen recovery utilizing a hydrojet unit and high volume dredges in an underground oil sands deposit according to an embodiment of the present invention.

Preferably, the hydrojet 20 travels progressively deeper into the ore vein 10, as illustrated in FIGS. 2-5, and dispenses the composition of the present invention into the vein 10 through ultra high-pressure jets. The hydrojet 20 can make one pass or multiple passes through the vein 10. Also, the composition can include a water/composition mix. In a preferred embodiment, the hydrojet 20 can be sized to effectuate a blast "front" area of chemical that is up to several meters in height and width to more efficiently clear the vein 10 in a minimum number of passes. The hydrojet 20 may be adapted to be operational either above ground surface or subsurface, although the predominant use of the device 20 will be subsurface. Preferably, the hydrojet 20 follows the path of the ore vein 10 for hundreds of meters below the ground surface. In a preferred embodiment, the hydrojet 20 is remote-controlled and/or robotic. An umbilical cord 30, as illustrated in FIG. 6, can be utilized to pump the composition to the hydrojet 20 from the ground surface and/or to control the movement and operation of the hydrojet 20.

As the composition is distributed within the vein 10 and contacts the oil sands, a slurry of chemical, sand and bitumen is produced. The hydrojet 20 continues to travel deeper into the ore vein 10. In one embodiment, the hydrojet 20 is submerged in a solution containing water and chemical composition as it travels through the vein 10. The slurry flows or is dredged to the ground surface using high-powered dredges 35, as illustrated in FIG. 6, and collects in a chemical pond 40, as shown in FIGS. 2-5. In a preferred embodiment, bitumen is skimmed from the surface of the slurry in the chemical pond 40, leaving clean sand and water. The bitumen product is removed. In one embodiment, the clean sand, which is preferably over 99% devoid of bitumen, is removed from the chemical pond and re-injected into the ore vein 10 to fill the void or mining scar left by the removed oil sands. Preferably, bitumen-free sand in the chemical pond 40 is dredged over a cofferdam or barrier 50, as illustrated in FIG. 2, so that the sand will remain clean and substantially free of bitumen. Continuous batch removal, flotation systems or other separation methods known in the art are applicable. Notably, the composition remains mainly in the aqueous phase and advantageously enhances and accelerates separation of aqueous and hydrocarbon phases.

The process and composition of the present invention is designed to improve the mining of bitumen in terms of economic efficiency, safety and environmental impact. The economic improvement is in the simplicity and increased speed of extracting the bitumen in a form ready for refining. This process and composition eliminates the need for the large and expensive excavation equipment, including excavators, chemical handling pumps, fans, blowers and centrifuges, previously required to lift and haul the bitumen ore to the pipeline pickup location. The process and composition of the present invention also eliminate the need for the multi-billion dollar infrastructure used in the antiquated Clark mining process. Previous methods have had a detrimental environmental impact due to the copious amount of greenhouse gas emitted on a daily basis. These previous methods have also caused damage to the water supply by adding large amounts of caustic and surfactant as sediment "fines" to the waste stream, which resulted in the contamination of hundreds of thousands of acres of settling ponds where water is held for decades. Preferably, the present invention eliminates the necessity for these long-standing contaminated ponds.

According to the present invention, the chemical composition may be recycled and reused for the purpose of bitumen recovery. In one embodiment, the aqueous chemical composition is removed from the settling pond 40, heated to an optimum temperature of about 160° F. and then recycled through the hydrojet 20 back into the ore vein 10. In certain embodiments, additional chemical composition is added to the recycled fluid if the water content has caused the chemical strength to be diluted. The speed with which the hydrojet 20 travels below ground surface makes it possible to economically maintain the optimum temperature for the chemical to separate the bitumen from the other components.

Figure 7:
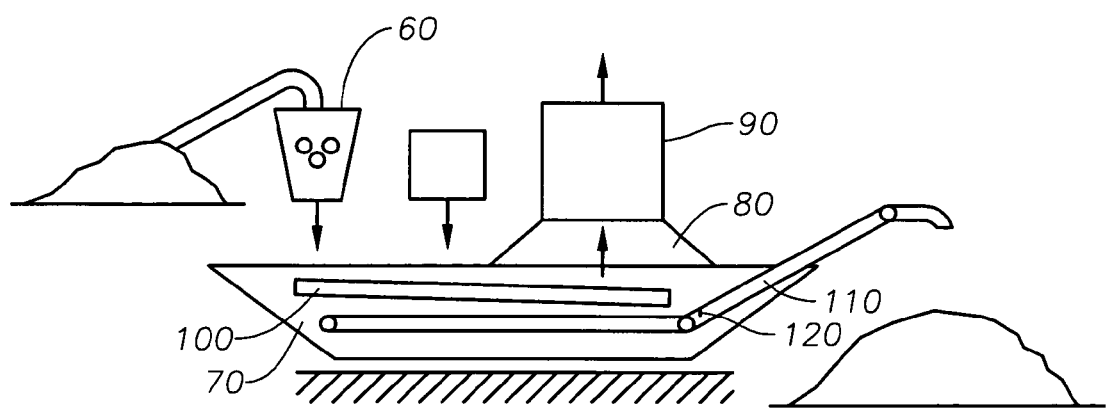
FIG. 7 is a simplified side view of a process for recovery of bitumen from an oil sands deposit that has been removed from an underground bitumen oil vein according to an embodiment of the present invention.

An alternative embodiment of the present invention is illustrated in FIG. 7. In this embodiment, oil sands deposits are treated to effectuate bitumen recovery after the deposits have been removed from the ground. Oil sands ore is removed from the ore vein 10 and conveyed into a grinder 60 to achieve uniformity. The grinder 60 feeds the ground ore into a chemical vat 70. In the vat 70, the oil sands ore is allowed to mix with the chemical composition of the present invention to form a solution or slurry. The composition is heated to 160° F. before being added to the vat. If the ore temperature is below 50° F., then hot air can be used to preheat the ore before it is contacted with the 160° F. composition according to an embodiment of the invention.

The addition of the composition to the oil sands deposits advantageously causes the oil sands deposits to settle out and separate into layers, for example a bitumen layer and a sand layer. In certain embodiments, the aqueous chemical composition will form its own distinct layer. The bitumen will float to the surface, where a mechanical skimmer 80 scrapes the bitumen and nominal amount of chemical composition from the surface. The skimmer 80 can be, for example, a chain driven, doctor bar type in one embodiment of the invention. The bitumen and composition are sent to an oil/chemical separator 90, from which the bitumen is removed and sent to a production facility or other desired location and the chemical composition is returned to the vat 70. The cleaned sand passes through shaker screens 100 and falls to a conveyor or an auger 110, wherein the sand is removed from the vat 70. In one embodiment, the conveyer or auger 110 can have an air sparger 120 located below it. The conveyor or auger 110 is preferably positioned to tilt upward such that the sand can be removed from the vat 70 while the chemical composition drains back into the vat 70 for reuse. In one embodiment, the chemical composition can be treated with a colorimeter 120 to maintain chemical strength. The clean sand is tested for TPH ("total petroleum hydrocarbon") content. If there is less than one percent TPH, the sand can be sent to fill the excavation scar of a bitumen oil vein 10 to at least partially fill the scar and aid in, for example, growing vegetation. If there is more than one percent TPH, the sand is preferably sent through a second, smaller process unit according to the present invention to achieve less than one percent TPH.

In the embodiments shown in FIGS. 1-7, the composition of the present invention can be recycled and reused without the need for significant treatment. Upon separation of the bitumen and other components into layers, the chemical composition of the present invention will preferably form its own distinct layer consisting of chemical and water that can be easily removed from a chemical pond 40 or vat 70 and recycled for reuse. The composition can be removed from the bitumen or sand by conventional means, for example evaporation. Advantageously, the chemical composition does not appear to saponify, emulsify, damage or react with bitumen or other hydrocarbon oils, nor is a significant amount of the composition dissolved into or entrained in the bitumen. Thus, the chemical can be easily recovered and reused. Further, no hazardous waste streams or contaminants are produced as result of using the chemical composition.

Typically, the oil sands deposits contain about 45.0% water by volume. According to preferred embodiments of the present invention, the concentration of water in the oil sands after bitumen removal and separation will be about 1.0 to 1.5% by volume. Generally, the concentration of water in the bitumen will be below 5.0%, which represents the industry standard, after treatment according to the present invention.

The composition and process of the present invention results in reduced energy consumption, as the bitumen oil is separated from the sand at a lower temperature than in prior art processes. Further, in a preferred embodiment the chemical composition only requires a single application of one chemical solution to the oil sands to effectuate separation versus the several applications, sometimes of multiple solutions, needed in prior art methods, and the contact time needed between the chemical and the oil sands is reduced. As a result, the energy consumed by operation of pump batteries and controller electronics is reduced, and the additional heat and air conditioning requirements in the additional space needed for multiple applications are eliminated. Further, the primarily aqueous nature of the chemical composition reduces the need for pure chemical handling and transport.

In a preferred embodiment, the chemical composition includes an ammonia compound, an alcohol, a peroxide and an aqueous carrier solution. Alcohols can generally be defined as R—OH where R is a combination of carbon and hydrogen atoms, water being excluded from such definition. The preferred alcohol of the invention is straight chained, as opposed to an aromatic, and has a continuous chain of carbon atoms from 1 to 8 carbons long. Saturated alcohols are generally preferred, as they tend to be more stable than unsaturated alcohols. Methyl alcohol, ethyl alcohol, and butyl alcohol are preferred. Propyl alcohol is particularly preferred. Of the propyl alcohols, isopropyl alcohol is particularly preferred. Mixtures of methyl, ethyl, propyl and/or butyl alcohols to create the alcohol of the invention are also encompassed in this invention. A mixture of ethyl and propyl alcohol is preferred. As the chemistry of the alcohol molecule is dominated by the functional OH group, it is understood by those skilled in the art that other alcohols can be effective alone or in combination. However, the use of only one alcohol having a continuous chain of 1 to 8 carbons or only one alcohol, that alcohol being the mixture of the one to eight carbon alcohols without other alcohols, is effective and preferred.

Notably, alcohols can also be created in situ, for example, through the reaction of salts with appropriate reagents in the presence of water. Creation of the alcohol in situ is also encompassed in this invention.

In an alternative embodiment, surfactants can be added to the chemical composition in order to decrease the water-oil interfacial tension and to improve the efficiency. In one particularly cost-effective embodiment, the invention provides efficient results through the use of a combination of only the peroxide, the carrier solution and one or more of the nitrogen-containing compound and the alcohol compound.

Ammonia can be provided in many forms, the preferred forms being anhydrous ammonia and ammonium hydroxide. Ammonia can be produced by reaction or dissociation. Ammonium ions such as dissolved ammonium salts are also encompassed within the invention. Ammonia is quite soluble in water, dissolving to the extent of about 700 volumes in 1 volume of solvent. The dissolving process is accompanied by the reaction $NH_3+H_2O$ thereby producing $NH_4^+ + OH^-$. This is referred to as ammonium hydroxide. Therefore, ammonium hydroxide, which is often produced commercially with significant amounts of ammonia in water, is included in the term ammonia in this invention. Also encompassed are other precursors that form the ammonium ion in situ.

Isopropyl alcohol, also known as isopropanol, has a formula of $C_3H_8O$ and is unsaturated. This is a particularly preferred alcohol of the invention. It is noted that isopropyl alcohol has a boiling point of 82.4 degrees C. and specific gravity of 0.78 at 20 degrees C. The air odor threshold concentration of isopropyl alcohol to be as 22 parts per million (ppm) parts of air. Contact between isopropyl alcohol and air occasionally results in the formation of peroxides, another possible element of the composition, whether added or created in situ. Therefore, in an embodiment of the invention, peroxide is formed from isopropyl alcohol. In another embodiment, peroxide is added to the composition when, for example, no isopropyl alcohol is present.

While the invention has been shown or described in only some of its forms, it should be apparent to those skilled in the art that it is not so limited, but is susceptible to various changes without departing from the scope of the invention.

What is claimed:

1. A process for recovering bitumen from oil sands deposits, the process comprising the steps of:
   heating a chemical composition to a temperature of 80 to 160 degrees Fahrenheit, the chemical composition comprising:
   ammonia;
   an alcohol containing from one to eight carbon atoms, wherein the alcohol is non-aromatic;
   hydrogen peroxide; and
   an aqueous carrier solution, wherein the aqueous carrier solution is water, the aqueous carrier solution is of sufficient volume operable to disperse at least one of the hydrogen peroxide, the alcohol and the ammonia in the aqueous carrier solution;
   introducing the chemical composition into the oil sands in an amount effective to, when added to the oil sands, cause a substantial amount of the bitumen to separate from the oil sands, resulting in a bitumen phase and a sand phase without the formation of an emulsion; and recovering bitumen from the oil sands.

2. The process for recovering bitumen of claim 1 further comprising the step of recovering a significant amount of the chemical composition subsequent to the introduction of the chemical composition into the oil sands such that the chemical composition can be used again.

3. The process for recovering bitumen of claim 1 further comprising the step of introducing the chemical composition into the oil sands after the oil sands have been removed from an underground bitumen oil vein.

4. The process for recovering bitumen of claim 1 further comprising the step of introducing the chemical composition into the oil sands after the oil sands have been removed from an underground bitumen oil vein.

5. The process for recovering bitumen of claim 1 wherein the chemical composition further comprises a surfactant.

6. The process for recovering bitumen of claim 1 wherein the chemical composition further comprises the absence of a surfactant other than hydrogen peroxide.

* * * * *

UNITED STATES PATENT AND TRADEMARK OFFICE
CERTIFICATE OF CORRECTION

| | | |
|---|---|---|
| PATENT NO. | : 7,628,909 B2 | Page 1 of 1 |
| APPLICATION NO. | : 11/236239 | |
| DATED | : December 8, 2009 | |
| INVENTOR(S) | : Harvey G. Cobb | |

It is certified that error appears in the above-identified patent and that said Letters Patent is hereby corrected as shown below:

Column 8, line 9, delete "after the oil sands have been removed from an underground bitumen oil vein" and replace with "while the oil sands are located in an underground bitumen oil vein"

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO.        : 7,628,909 B2                              Page 1 of 1
APPLICATION NO. : 11/236239
DATED             : December 8, 2009
INVENTOR(S)       : Harvey G. Cobb It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this

Second Day of November, 2010

David J. Kappos
*Director of the United States Patent and Trademark Office*